Patented Sept. 11, 1945

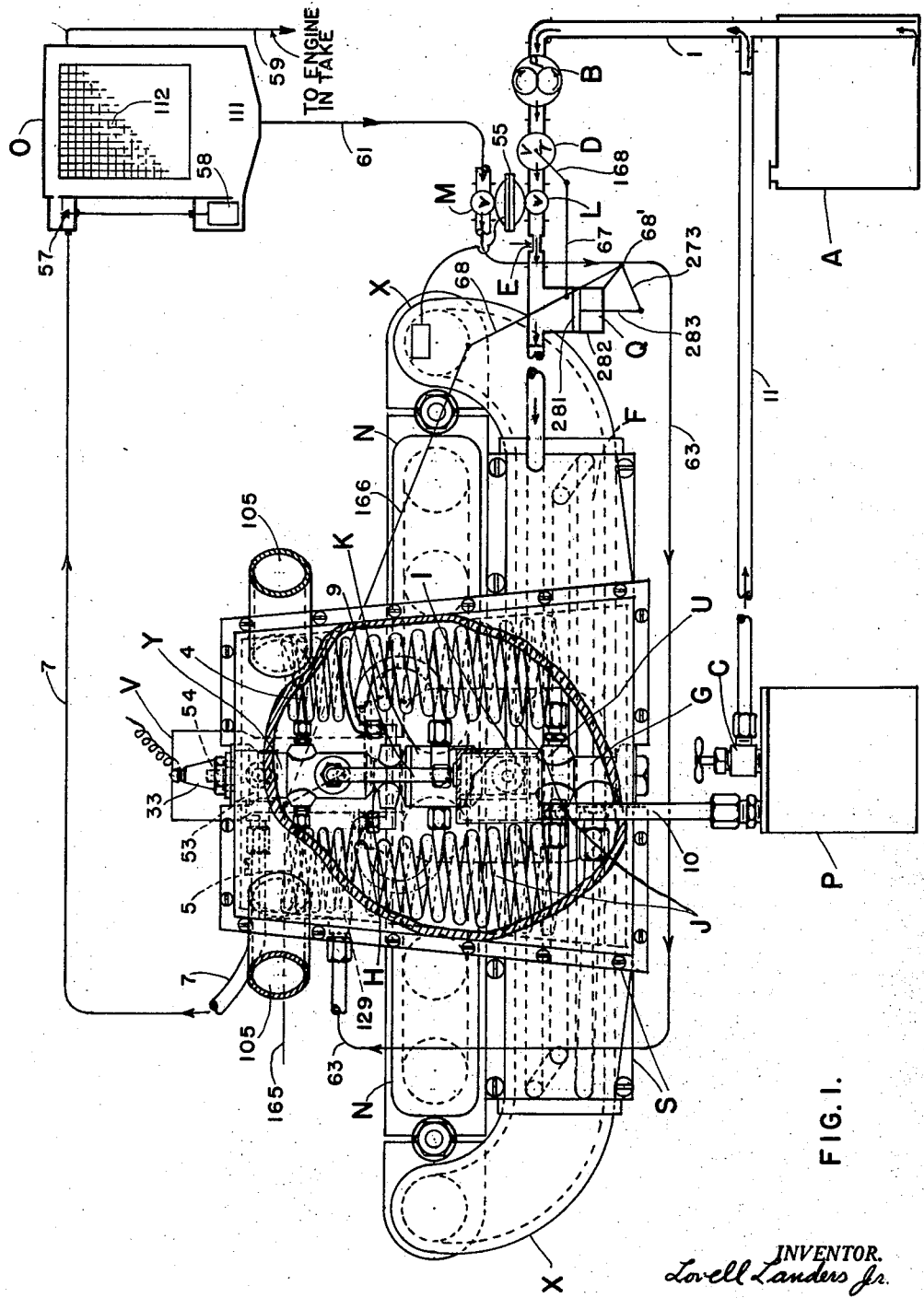

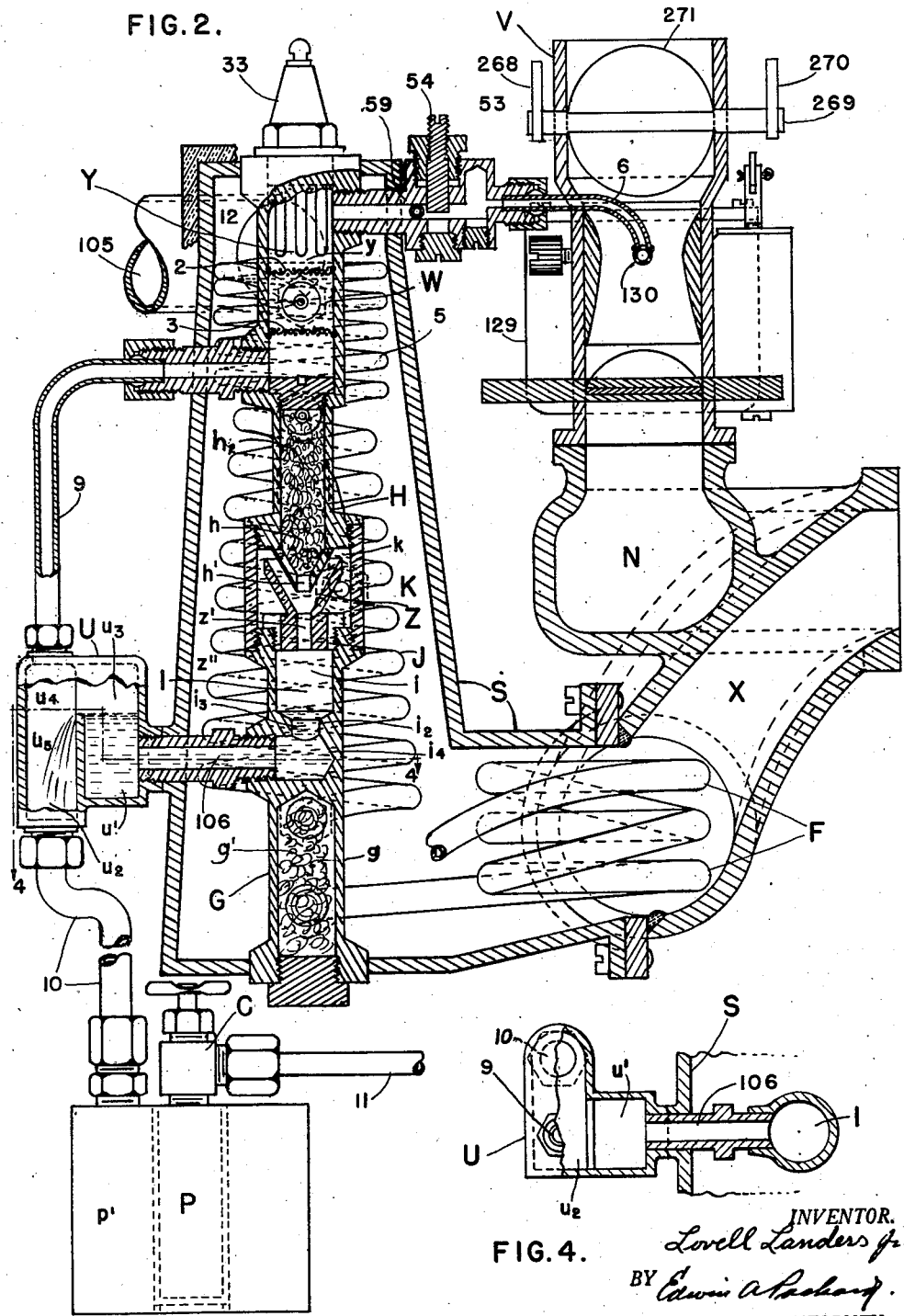

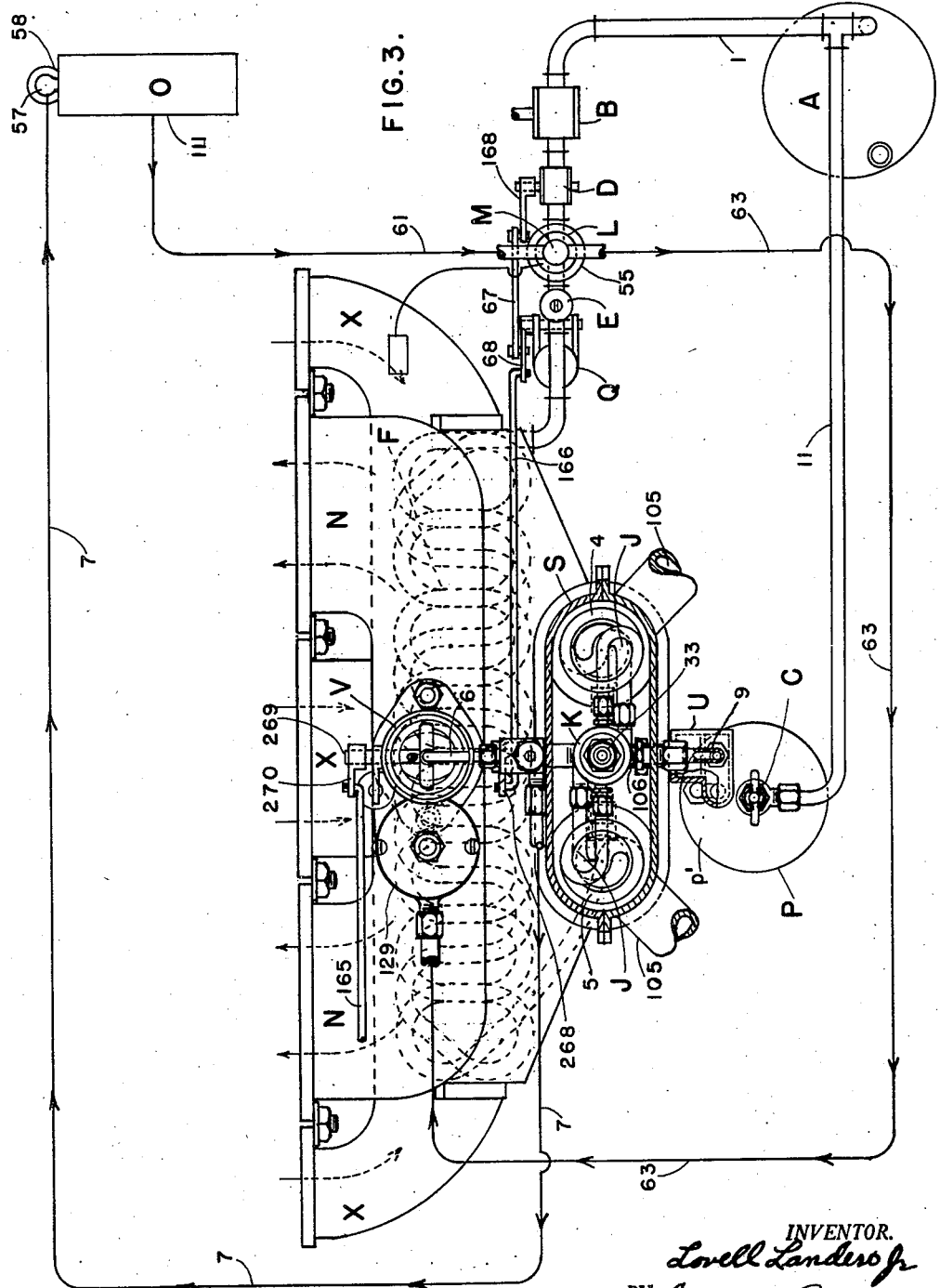

2,384,473

UNITED STATES PATENT OFFICE 2,384,473

SYSTEM FOR VAPORIZING CRUDE OIL FOR USE AS A FUEL FOR INTERNAL-COMBUSTION ENGINES AND CONVERTERS FUNCTIONABLE THEREIN

Lovell Landers, Jr., Ossining, N. Y.

Application October 12, 1943, Serial No. 505,928

10 Claims. (Cl. 48—107)

One object of the invention is to employ liquid hydrocarbons such as crude petroleum as a basic fuel and to directly convert the same by destructive distillation or vaporization into combustible gases or vapors suitable for employment as fuel for operating an internal combustion engine or for doing other useful work.

The invention hereof revolves about a vaporizer, gas-making retort or converter having no fundamentally essential moving parts and which is particularly adapted for effecting, by the indirect application of relatively high heat, the conversion or vaporization of liquid hydrocarbon oils containing the heavy or less volatile type of liquid constituents as well as certain light or more readily volatile types of liquid constituents whereby there is realized a resulting product in gaseous or vaporous form, namely, a product or products collectively referred to herein for the purpose of identification as vapors.

Where crude petroleum or analogous heavy fraction-bearing oil is used as the basic fuel some of the light or readily volatile constituents thereof—assuming such light constituents existing therein—pass off as gases or vapors when the basic fuel is heated to temperatures within a range of approximately 160° F. As to other less readily volatile constituents which are of a character not requiring the high temperatures mentioned herein many of these will pass off as gases or vapors when the heating of the basic fuel is continued to within temperature ranges reaching up to approximately 700° F. or even up to 850° F., while for other heavier constituents a higher degree of heating is required for the conversion into gases or vapors. A considerable percentage of the hydrocarbons is converted into the gaseous and vaporous form at temperatures within the range of approximately 850° to 1250° F.

For practical and successful operation such as is required for certain uses all of the volatilizable liquid constituents must be converted by a relatively continuous process into the gases or vapors referred to herein as vapors. In the instance of crude petroleum and of certain analogous hydrocarbon liquids there are realized as the result of the required high heat treatment for the vaporization or gasification of the vaporizable hydrocarbon solid residuals some of which may be of an earthy or foreign character and certain of which are experienced or realized in the form of small coke-like products or carbon particles.

The gas retort, converter, or vaporizer hereof is frequently referred to herein as a vaporizer and is the instrumentality relied upon for effecting the vaporizing operation by the indirect heating of the fuel. The vaporizer hereof may be viewed as constituting the heart of the system. It is constructed and connected into the system so that any fine coke or solid residual particles which would otherwise come into existence and build up to an objectionable extent in the system can be progressively eliminated by separating out and diverting partially treated fuel (hot liquid fuel carrying residual solids suspended therein) by filtering out the suspended solids from the diverted liquid fuel and by returning the filtered diverted fuel to the process for re-treatment in the vaporizer.

In this manner there is realized the production from liquid fuels, by indirectly heating the same to effect vaporization and gasification of the liquid hydrocarbons, of fuel in vaporous or gaseous form substantially devoid of fine carbon or solid residuals and of a character suitable for use in an internal combustion engine or for other useful purpose.

One aspect of the invention revolves about a system according to which the vapors produced by high temperature distillation or vaporizing from a liquid hydrocarbon fuel such as crude petroleum can be employed to provide gaseous or vaporous fuel for operating an internal combustion engine.

A further aspect of the invention contemplates a system wherein some of the vapors from the vaporizer or retort are diverted or transferred to a condenser whereby incident to a cooling of the vapors there is realized a liquid condensate which is suitable for providing a liquid type of fuel for use as a petrol or as motor spirits, namely, as a fuel quite equivalent as to its functioning characteristics to the present-day gasoline, and in the instance of such diverted vaporous fuel, which has lost certain of the condensable constituents formerly therein, the remainder or uncondensed portion thereof continues on its way to a locality where it is mixed with and constitutes part of the non-diverted vapors that are on their way from the vaporizer to the engine.

The novel features considered characteristic of my invention are set forth with particularity in the appended claims. The invention itself, however, both as to its organization and its method of operation together with additional objects and advantages thereof, will best be understood from the following description of the specific embodiments when read in conjunction with the drawings hereof.

As illustrating a manner in which the invention hereof may be realized reference is made to the accompanying drawings which constitute a part of this specification.

In said drawings there is illustrated a new and novel form of liquid fuel vaporizer or converter and by said drawings there is indicated the manner in which it may be employed and for the realization of the invention to which this application for patent and the patent ultimately granted thereupon is directed. The vaporizer or converter is shown in detail whereby the essential or important structural features thereof will be readily understood and for that purpose certain parts have been (a) either broken away, as for example, in the case of the vaporizing chamber structure or casing S of the hereinafter referred to Fig. 1, or (b) by sectional or partial sectional views as is the case with respect to the hereinafter referred to Figs. 2 and 3.

In the drawings hereof there is diagrammatically illustrated or indicated how the vaporizer or converter and the functioning parts thereof are or may be brought into operative and functional relationship with a hydrocarbon engine of the internal combustion type and which engine may be viewed as the means for supplying hot gases for carrying out the vaporizing operation and it may also be viewed as an instrumentality in which the vaporous or gaseous products realized by the operation of the vaporizer are employed. The arrangement and association of parts embodied in the system of which the engine may be considered as constituting a part follows much after the arrangement and association of functioning parts and the mode of operation thereof disclosed with respect to the converter and power plant shown and described in relatively extended detail in my patent application bearing Serial No. 467,115 filed in the U. S. Patent Office on November 27, 1942, and entitled "System for vaporizing crude oil for use as a fuel for internal combustion engine and converter functionable therein." Said already filed application may be employed or relied upon to amplify or complement certain details of construction particularly as to auxiliary or coordinated parts or features of the system, to wit, parts of features that are employed or that are employable in connection with the new converter of this application.

In said drawings:

Fig. 1 is a vertical view showing the converter structure partially broken away and indicating in diagrammatic arrangement the manner in which the converter is embodied in a power plant, embodying a hydrocarbon engine of the internal combustion type.

Fig. 2 is a vertical view primarily in section showing an exhaust manifold of the hydrocarbon engine, the internal structure and functioning parts of the converter, a hollow casing structure and a carburetor connected in operative association and arrangement with the functioning parts of the converter on the one hand and the intake manifold of the engine on the other hand.

Fig. 3 is a plan view partially in horizontal section showing certain functioning parts of the converter and also diagrammatically indicating how the functioning parts of the converter and associated and auxiliary parts of the system are connected up and brought into operative relationship with respect to the engine, particularly with respect to the exhaust and intake manifold of the engine.

Fig. 4 is a horizontal sectional view taken as on the plane indicated by the lines 4—4 of Figs. 2 and 3 looking in the direction of the arrows.

In the system of the previously identified application Serial No. 467,115, the converter or vaporizer thereof had moving parts to aid in spreading and vaporizing the liquid fuel while undergoing indirect heating to effect the vaporization thereof, to wit, from hot exhaust gases leaving the engine and there were also employed mechanical instrumentalities for handling and eliminating solid residues realized in and incidental to the continued functioning of the converter.

According to the invention hereof the new converter is primarily dependent upon the employment of indirect heating obtained, as for example, from hot exhaust engine gases but the new converted and associated parts are so made and embodied in the system as to avoid the essential employment of movable mechanical parts in and for the gas-converting or vaporizing operation proper.

The construction of the new converter is such that there is realized in and by the same a progressive and relatively continuous elimination or removal of solids as matter suspended in partially converted or partially treated fuel and which solids would otherwise accumulate in the converter as an objectionable and deleterious body of matter that would ultimately deter or stop the vaporizing operation. This progressive elimination or removal of solids is realized by entrapping and diverting some of the partially gasified liquid fuel from the fuel flowing within the converter, the transfer of said diverted or entrapped fuel to a closed filter having a suitable filtering medium, filtering the diverted fuel by said filtering medium, whereby the suspended solids are left within the filter at the inflow side of the filtering medium, by passing the filtrate thus obtained and freed of suspended solids back into the converter whereby all of the volatilizable constituents of the fuel due to the cyclic treatment just outlined can ultimately be converted into gas or vapors while, as above indicated, leaving behind in the filter the solid residues which would otherwise collect within the vaporizer proper and constitute objectionable aspects of the process.

One will readily appreciate that while there are certain fundamental features common to and employed in the apparatus of the above identified application Serial No. 467,115 which are adaptable to the invention of this application for patent, nevertheless, it will be understood that there must exist certain fundamental features having decidedly different characteristics particularly respecting the converter of each of said applications and of certain parts operatively associated with each of said converters.

Reference is now made to the drawings in detail:

In the drawings hereof A is a crude oil reservoir, namely, a reservoir wherein liquid fuel such as crude petroleum is stored or held for use as supply fuel to be vaporized for operating an engine or for other useful work. However, it will be understood that many types of relatively heavy non-readily volatile types of oils can be used as a liquid fuel employable in the system of apparatus thereof. For example, one may use and vaporize by the system hereof Diesel engine oil or even crank case lubricating oil.

I is the fuel pipe or supply line leading from the crude oil reservoir A to a pump B. This pump is driven directly from the engine whereby the speed of the pump and quantity of oil pumped thereby becomes a function of the speed of the engine. This pump is of a by-pass type according to which when the pressure at the delivery side thereof is excessive there can be a release of some liquid past the pump back to the suction side of the pump. By means of the pump B the liquid fuel is sucked from the reservoir and is forcibly passed into the converter by a continuation of the pipe line at the delivery side of the pump, or by means providing a liquid flow-path leading from the pump into the converter. This delivery of pumped fuel into the converter is against any back pressure of gas existing within the converter. The pipe line or means providing a flow-path leading from the pump B to the converter is to a pre-heating or first vaporizing coil F, and there are embodied and employed in operative succession ahead of the coil F a supply fuel throttle valve D connected to the pump B at the delivery side thereof, a thermostatically-controlled supply fuel or crude petroleum valve or valve unit L, means E providing a variable jet or adjustable flow-path opening through which delivered pumped fuel must pass, and means providing an accelerating pump Q which can function to collect and hold a limited amount of supply fuel and to inject into the flow-path a quantity of such collected and held fuel incident to the movement of a plunger or equivalent member of the accelerating pump Q.

In Figs. 1 and 3 there is indicated an operator control linkage embodying such parts as swinging arm 168 connected to and provided for actuating a movable valve member of throttle valve D, a lever 68 fulcrumed at 68', (see Fig. 1) a link 67 connecting the free end of arm 168 and an intermediate section of lever 68, a link 166 connecting the swinging end of the lever 68 and a free end of a swinging arm 268 mounted on a shaft 269, a swinging arm 270 mounted on shaft 269 and an operator's rod 165 pivotally connected to the free end of the swinging arm 270. This shaft 269 operates a butterfly valve 271 in a carbureter V.

As to the accelerating pump Q, this has a movable plunger 281 operable in a cylindrical casing 282 through the medium of a swinging arm 273, the free end of which has an operating connection with the plunger 281 through the medium of a plunger rod 283. The lever 68 and said swinging arm 273 which projects therefrom, constitutes a bell crank lever fulcrumed at 68', to wit, the fulcrumed point for lever or arm 68.

The linkage just referred to provides operator control ultimately through the medium of the movable valve member of the throttle valve D of the flow of liquid supply fuel to the vaporizer when the thermostatically-controlled supply fuel valve L is open. The same linkage also provides operator control from the flow of vapor condensate, herein referred to as crude petrol or crude gasoline to the carbureter V as will more fully hereinafter appear when thermostatically controlled petrol valve M is open. This control and flow of petrol or condensate to the carbureter V is associated with the positioning of the main air or movable butterfly valve member 271 in the carbureter valve V as said shaft 269 is actuated by the operator moving rod 165 and thereby swinging arm 270 on said shaft. Said flow of condensate or petrol to the carbureter can take place if and when the vaporizer is cold or below operating temperature at which time the thermostatically-controlled petrol valve M is open.

As to the thermostatically-controlled supply fuel valve L, this and the associated thermostatically-controlled petrol valve M are conjointly operated by a thermostat 55 which is located wherever the heat of the motor will most conveniently serve to operate the thermostat. This thermostat is shown schematically to better illustrate the coordinated function of the progressive steps in the process. This thermostat, and the valves L and M operated thereby are quite similar as to operative position and arrangement as that of the thermostat 55 of the above identified application Serial No. 467,115. The valves L and M of this application and their coordinated operation under the control of the thermostat are quite analogous in construction and functioning to the valves L and M of said application Serial No. 467,115 and which are shown in Fig. 12 of that application.

As previously indicated a positionable variable jet means E is intermediate the thermostatically-controlled fuel valve or unit L and the accelerating pump Q which feeds the first vaporizer or fuel pre-heating coil F.

This coil F is shown as being located in the exhaust manifold X of the engine. This exhaust manifold thus in effect provides part of a casing structure for the converter. The exhaust manifold X employed for this purpose may be viewed and referred to as a hollow member providing a hollow pre-heating or first vaporizing coil casing into which the hot products of combustion or exhaust gases from the engine cylinders are received through passage area or inflow openings and from which the exhaust gases move to a subsequent hollow-member or casing structure S wherein other functioning parts of the converter or vaporizer are embodied. The exhaust gases finally pass from casing structure S through overflow area or discharge passage opening 105.

As to the converter or vaporizer proper, this embodies not only the first or pre-heating pipe coil F but also other sets of pipe coils constituting tubular heat transfer members disposed in serial arrangement with other functioning parts, all of which are embodied in the hollow casing or chamber providing structure S that receives the hot exhaust gases from the exhaust manifold X and from which the exhaust gases after having performed their work, pass through the aforementioned discharge opening or pipe 105, as and after said exhaust gases have imparted heat to the fuel and fuel products flowing within and through the aforementioned coils or tubular heat-transfer members within the casing structure S.

From the drawings it will be seen that the first vaporizing or pre-heating pipe coil F is connected to and delivers into a hollow member G in the casing structure S. This hollow member G in effect constitutes a tubular connecting member between a first and second set of vaporizing coils. Said hollow member G may also be viewed as constituting a first receiving trap or as providing a liquid-receiving space g within which there is preferably embodied a catalyzing member or element g' arranged in the path of liquid or vapors which progressively move forwardly within and through the receiving space g.

A second set of vaporizing or heat interchanging pipe coils J is connected to and extend from the trap structure G, leading from the receiving space g therein, to a hollow separator structure K. By these pipe coils J there are provided extending flow paths for the fuel or fuel products which pass from the upper interior portion of the trap or hollow connecting member G into a hollow cylindrical wall member $k$ of the separator K. As to the separator K, this includes a lower hollow member or portion I providing that which may be viewed as a member providing low liquid trapping pocket or residue-receiving chamber $i$ and a hollow upper chamber structure H provided therein, a second chamber $h$ in which a catalyzer or catalyzing material is included or located. The lower end portion of the upper chamber structure H tapers downwardly and inwardly and has a relatively small opening $h'$ therein leading upwardly thereinto. In the hollow cylindrical member K there is located a funnel-shaped baffle member Z which underlies, overlaps and is vertically spaced from the lower tapering end of the member H whereby a downwardly and inwardly directed flow path is provided between the low tapering end of the member H and the surrounding funnel portion of the member Z. The baffle member Z is held in place relatively to the parts referred to in any suitable manner as by a threaded screw connection to the residue chamber structure I. A downflow passage $z'$ is provided leading from the interior of the funnel to the residue chamber $i$ primarily for the downward passage of solids and liquids carrying the same which have been separated out within the funnel shaped member Z. There are also provided other downflow passages $z''$ leading from the space between the hollow wall member K and the funnel member Z on the one hand to and into the residue receiving chamber I on the other hand. In short, the funnel-shaped member Z, because of its location and arrangement functions as a baffle or flow-diverting member which furthers the separation of the vaporous or gaseous portion on the one hand of the liquid fuel undergoing treatment and certain unconverted liquid portions bearing solid matter therein on the other hand and whereby the latter is ultimately passed to and within the residue chamber $i$, while at the same time permitting the separated out vapors or gases to pass upwardly through the opening $h'$ into the second catalyzing chamber $h$ of the chamber providing structure H, and wherein catalytic material $h^2$ is disposed.

A hollow structure or member Y which is also within the casing structure S is physically connected to the second catalyzing chamber structure H but is functionally separated from the latter except through the medium of a third set of heat inter-changing pipes 4 and 5 constituting a third set of vaporizing coils. Each coil of the third set of vaporizer coils 4 and 5 is connected to the chamber structure H and leads from the second catalyzing chamber or space $h$ of the latter to and into the hollow member Y wherein there is provided that which is herein referred to as a mixing chamber, or as a conditioning chamber $y$. This third set of pipe coils 4 and 5 therefore provides extended flow-paths leading from the interior of the second catalyzing chamber $h$ to and into the mixing or conditioning chamber $y$. Within the structure providing the mixing chamber $y$ there is contained a catalyzer filter with horizontally extending and transversely disposed sections 2 and 3 which are vertically spaced relative to one another and the upper ends of the third vaporizing coils 4 and 5 deliver the inflow vapors or gases into the space between these screens. Below the lower screen 3 there is left a space wherein either vapors or liquids can be received, for example, into a space in which vapors can pass from a residue trap member U hereinafter referred to through a pipe 9, or downwardly from which space below the screen 3 liquid can gravitate through said pipe 9 into the residue trap member U. The detail construction of this trap embodying the member U will hereinafter be referred to more in detail.

Above the upper screen 2 there is left a space upwardly into which vapors pass from screen 2. In this upper space or upper section of the mixing or conditioning chamber $y$ there are provided glow wires 12—resistance wires—which can be electrically heated to incandescence by any suitable instrumentality, as for example, through any suitable electrical supply or generating means associated with a power plant. These wires can be employed for further vaporizing or heating, or as otherwise expressed for conditioning the resulting gaseous products before passing from the mixing chamber structure $y$. This last section of the mixing chamber may be viewed as a final conditioning section for assuring a uniform conditioning of gas or vapors before passing from the vaporizer or converter.

The upper portion of the chamber $y$ where glow-wires are located is in communication with a vapor supply jet or vapor delivering tip 130 located in an air-vapor mixing portion or throat section of carbureter V. Said connection is through the medium of a suitable piping or means 6 providing a vapor transfer passageway leading from the mixing chamber $y$ to the carbureter V. The carbureter V is connected for delivering air-fuel mixture into the intake manifold of the engine, to wit, under the influence of suction as the engine operates or "turns over" incident to the starting up thereof. The vapor-delivery tip 130 and its association with the throat portion of the carbureter constitutes that which may be broadly referred to as vapor-air mixing means by which a proportioned air-vapor ignitable mixture is supplied to the intake manifold N of the engine.

In the apparatus shown there is a valve mechanism 53 which is directly connected to the mixing chamber and which in effect constitutes a part of the pipe or means 6 heretofore referred to. The valve mechanism embodies an adjustable plug or valve member 54 which may function as an adjustable metering valve to regulate and restrict the effective flow area or passageway of the pipe or tubular means 6. If desired a vapor throttle valve mechanism can be installed in said pipe line 6 and the movable throttle valve for such vapor throttle valve mechanism can be readily connected for operation from and by the operator linkage heretofore referred to.

From a location between the interior of the mixing chamber $y$ and the movable member 54 of the metering valve there extends a branch pipe 7 leading to a condenser O for diverting and supplying to the latter some of the gases or vapors whereby to obtain from the diverted vaporous products a condensate for providing a liquid starting up fuel analogous to the present-day gasoline and which is sometimes referred to herein as crude petrol or crude gasoline.

Reference has heretofore been made to the trap member U. This member may be referred to as an outlying trap member or as a laterally disposed portion of a liquid-solids interceptor trap. This member together with the hollow residual chamber structure I and a horizontally-extending tubular connection 106 constitute a construction which is herein identified as an intercepting trap disposed for catching and holding separated-out partially treated liquid fuel bearing residual solids suspended therein. A horizontal section through this outlying trap member U, to wit, a horizontal section taken on the planes indicated by the broken line 4—4 looking in the direction of the arrows of Figs. 2 and 3 is shown in Fig. 4.

Referring back to the structure I providing the residual receiving chamber $i$, it will be noted this structure has an intermediate inwardly extending portion or ridge $i^2$ providing therethrough a passageway $i^3$ leading into a lowermost chamber $i^4$ that is embodied in or provided by the same structure which provides the residual receiving chamber $i$, in fact, this lower chamber $i^4$ may be viewed as a lowermost portion of the residual receiving chamber provided in or by the chamber structure I. From this chamber structure I there extends the tubular member 106 leading between the lowermost chamber $i^4$ and a pocket portion $u^1$ in the trap structure U. (See Fig. 4.)

In Figs. 2 and 4 it will be seen that the trap structure provides a lower pocket or chamber $u^2$, a rising conduit portion or flow passageway $u^3$, means providing an overflow ledge $u^4$ and a downwardly extending conduit portion or flow passageway $u^5$ from the latter of which a downwardly extending tube 10 leads between the flow passageway 4 to and into the intake or fluid-receiving portion $p^1$ of the filter P.

A tubular connection 9 leads between the pocket $u^1$ of the trap structure U and the interior of the mixing chamber structure Y—preferably that portion of the mixing chamber which is below the lower screen 3 thereof. That portion of the residue chamber structure I providing the residue receiving chamber $i$, the tubular connection 106 and the outer trap U, because of the elevated overflow portion $u^4$ within the latter, collectively constitute a holding pocket for retaining liquid therein at sufficient height to effect or provide a liquid seal against a flow of vapor downwardly into and through pipe 106, while at the same time providing or affording passageway for releasing collected unvaporized liquid with residual solids therein to the filter P that is provided for effecting a separation therein of the solids residual particles preparatory to a return of the unvaporized liquid for re-processing or for further processing within the heat interchanging coils of the converter. In this manner due to the intercepting trap and the overflow $u^4$ thereof, there is provided a construction according to which partially treated liquids can be diverted from within the vaporizer or converter proper, and can thereafter be filtered and recycled until all vaporizable liquid fractions or vaporizable portions of the fuel oil are converted into vaporous form and thus made available for direct use in a hydrocarbon engine and this while avoiding passing into the engine cylinders of solid residues which are separated out by the liquid diverting and filtering process. The pipe 9 also serves to provide equalizing pressure conditions for the sections within the converter which are thus directly or indirectly connected thereby or therethrough.

The filter P is a closed structure, the liquid bearing solids are received in the section $p'$ of the filter, the liquid passes through filtering medium $p$ and the effluent is passed from the filter to the filtrate valve C and pipe line 11 leading therefrom to the feed line 1. It will be noted that the filtered out solids collect in the receiving portion of the section $p'$ of the filter or upon the filter medium $p$. The filter may be of a type in which the filtering medium can be readily removed by opening the filter for that particular purpose preparatory to another filtering medium being replaced therefor. The filter may be of a type in which the filtering medium is progressively cleaned without necessitating the removal thereof but of a type permitting the ready removal of filtered out solids.

The filtrate from the filter which is passed through the filtrate line 11 to the feed line 1 is now relatively free of solids and is readily returned to the vaporizer with the incoming fuel and cyclic operations can be thus carried out until all of the vaporizable fractions of the fuel being treated can be ultimately obtained as gases or vapors usable in or for the gas engine. The solids are progressively removed and the retention of any solid residues or accumulated solids matter within the vaporizer is continuously avoided or taken care of whereby it can not detrimentally affect the operation of the vaporizer.

Mention has been made of the condenser 0 and a branch pipe 7 leading from the chamber to the condenser. The condenser has suitable cooling coils 112 and the condensate collects in a closed tank or receiving space 111 thereof provided as an associated part of the condenser. In this tank there is a float 58 which controls a valve 57 which when the tank is empty or when the condensate within the tank is low, allows the valve 57 to remain open whereby gases or vapors can flow through the pipe 7 into the condenser but which when the condenser tank is full, shuts off the branch pipe 7. The condenser has a suction line 59 leading therefrom to the intake manifold whereby to pass into the intake side of the engine such of the diverted vapors or gases as have not been condensed within the condenser. When the engine is cold as at a period of starting up, the thermostatically controlled petrol valve M is open—the thermostatically controlled liquid fuel valve—the crude petroleum valve L in the main fuel supply line 1 is closed—and at such times and under such conditions the "turning over" of the engine as by the engine starter sucks air into the throat of the carbureter and this in turn causes condensate which has passed through the pipe line 61, thermostatically controlled petrol valve M and pipe line 63 to and into the float chamber 129 of the carbureter to pass from the latter and into the mixing section within the throat of the carbureter whereby an air-condensate mixture can be supplied for starting the engine and for continuing its operation until the vaporizer is hot and in condition ripe for the automatically taking on of the engine load by supplying an air-vapor mixture from the mixing chamber $y$ to the carbureter.

It is believed that the adaptability of the system for operating an internal combustion hydrocarbon engine is manifest from that which has preceded. However, a terse statement in regard thereto may be helpful in more plausibly bringing out important features or aspects thereof.

The fuel converting system functions only when the heat interchanging coils thereof are hot, and when the system is employed in conjunction with a hydrocarbon engine the heat for this purpose is derived from the hot exhaust gases of the engine. It therefore follows that the engine must be started by other than the hot vaporized fuel produced by the system.

The fuel supplied for starting the engine may be ordinary gasoline or petrol employed in the usual way for starting a gasoline operated engine. Generally and ordinarily the starting fuel employed will be liquid condensate derived from the vapors or gaseous products of the process.

Such condensate is herein referred to as crude gasoline or crude petrol. The crude gasoline is supplied for starting the engine until the engine is hot and until the exhaust gases have heated the fuel converting system up to functioning condition. When this condition has been attained, crude petroleum, or for example any other heavy liquid hydrocarbon, is supplied to the system, and as this crude petroleum becomes vaporized or gasified sufficiently to take over the load, the hot vaporized fuel produced therefrom is supplied to the engine and the crude petrol or gasoline is correspondingly cut off.

The supplying of crude petroleum from the system and the cutting down or off of the gasoline or liquid condensate is under the control of the thermostat 55 that is associated with the engine and which, when cold, allows the passage of condensate from the condensate tank 111 from pipe line 61 through valve M into pipe line 63 to float chamber 129 of carburetor while at the same time holding closed valve L in the crude petrol supply pipe line 1.

When, however, the thermostat 55 has attained a condition indicating hot operating conditions for the system, it causes an automatic closing of the petrol or condensate control valve M and a corresponding opening of the crude petroleum valve L. The opening of the petroleum valve L permits the flow of forcibly pumped crude petroleum through the variable jet E and accelerating pump Q into the pre-heating or first vaporizing coils F from which the pre-heated fuel enters the hollow member G. This hollow member G may be viewed as a first catalyzer trap wherein some of the globules may be broken up by catalytic action.

From the hollow member G the pre-heated oil and any vapors derived therefrom pass into the heat interchanging pipe coils J constituting a second set of vaporizing coils wherein pre-heated oil from the first set of coils F is substantially vaporized. This second set of coils J is connected to a hollow separator K wherein oils which have not been vaporized are separated from the vapors and gases which enter the hollow upper chamber structure or portion H providing a second catalyzer wherein catalytic action takes place.

From this hollow portion H the vapors and gases enter the third set of heat interchanging coils 4 and 5 which may function as vaporizing coils or as superheater coils. From the last mentioned coils 4 and 5 the gaseous products pass into a hollow structure or member Y providing a mixing or conditioning chamber therein. In this chamber there is located a catalyzer filter W by which the light and heavy vapors are caused to mix and from which the vapors pass into contact with the glow wires 12 of the glow plug 33.

From this mixing or conditioning chamber the conditioned vapors pass into the valve 53 having therein the adjustable plug or valve member 54 and whence the vapors pass into the delivery tube 6 which is connected to the carburetor jet or vapor delivery tube 130 constituting part of a vapor-air mixing device.

The pressure of the vapor from the tube 6 overcomes any tendency for suction effect at the jet or tip 130 thereby preventing the gasoline or condensate which is in the carbureter float chamber 129 from being drawn into the mixing device, or as otherwise expressed, into the intake manifold N of the engine. The vapors and gases mixed with air then pass the throttle valve 271 of the carbureter V into the intake manifold N. As the vaporizing process is carried out in the system, certain quantities of heavy oils with residues or solid matter therein are separated from the vapors and gases in the hollow separating chamber K. These separated heavy oils with solid separated matter suspended therein pass into the hollow member or portion I which is sometimes herein referred to as a residue receiving chamber.

This hollow member I constitutes part of an intercepter trap that also includes the tubular connection 106 of the outlying overflow member U. From this last member U liquid with the solids therein pass as overflow liquid into and through the pipe 10 to the influent receiving portion of the filter P. Any lighter oils not vaporized and which collect in the bottom of the hollow structure Y providing the mixing or conditioning chamber flows from this mixing chamber through the pipe 9 to the outlying trap member U to join the heavy oils which pass to the filter P through the pipe 10.

Due to the action of the pump B on the feed line 1 there is effecting a passing of filtrate from the effluent side of the filter into and through the pipe 11, past the valve C therein into the feed line 1. In this manner the effluent from the filter is returned to the process and a cyclic system for any unvaporized oil is completed. The filter P is essentially of some construction according to which the filter medium thereof can be changed or cleaned whereby the filter can operate in a continuous manner. The casing structure S providing the heat chambers is preferably covered with insulating material particularly when used in extremely cold climates.

Results have been pointed out that the condenser O is connected by pipe 7 to the mixing or gas conditioning chamber Y through the medium of the body member 59 of the valve 53 whereby some of the vapors will be conducted to the cooling cells 112 of the condenser, which cells are positioned so that the condensate derived thereby can collect in the condensate receiving tank 111, and from which the condensate is conducted as required for the starting operation by the pipe 8 past the valve M which is held open by the thermostat 55 when the motor is cold.

The adjustable plug or valve member 54 in pipe line 6 leading from the mixing or conditioning chamber y to the vapor delivery tip 130 of the air-vapor mixing means, functions as a metering valve. It is feasible, however, to provide the valve or member or even another valve in said line, with a connection to the operating linkage for the system whereby in and for said pipe line 6 there is an automatic positioning of the valve for varying the flow area through the pipe and thereby effecting a variable flow control of vaporized fuel from the mixing or conditioning chamber to the air mixing device or carburetor for the engine. Such a valve arrangement is shown in operative association in my aforementioned application bearing Serial No. 467,115.

As example of material suitable for use as a catalytic agent employable in or as part of the system, mention may be made of metals such as copper, silver, nickel or aluminum or composition thereof. The list of such metals is not by way of limitation since the invention herein is not limited to the use of such metals as there are many other catalyst or catalytic materials which can function in a satisfactory manner in furthering the carrying out of the process.

The catalyst or catalytic material may be in any suitable shape such as wire in the form of helical springs, or in the form such as scoops, strips, or bars.

What I claim is:

1. A vaporizer for liquid hydrocarbon fuel comprising in combination a hollow casing having a passage area for the inflow of hot gases and passage area for the outflow of said gases after passing over and in heat interchanging engagement with the pipe coils hereinafter referred to, a main fuel supply pipe, a hollow structure providing therein a liquid-vapor separating chamber, initial vaporizing pipe coils connected for receiving fuel from the fuel supply pipe and leading into the separating chamber, liquid-vapor separating means in the separating chamber and functionally dividing it into a liquid-solids receiving section and a vapor-receiving section, a hollow member providing a catalyzing chamber, means providing a vapor passageway leading from the vapor-receiving section into the catalyzing chamber, catalytic material in the catalyzing chamber, a hollow structure providing a conditioning chamber, subsequent vaporizing pipe coils leading from the interior of said catalyzing chamber into the conditioning chamber, a valve-controlled pipe leading from the conditioning chamber for conducting the conditioned vaporized fuel therefrom, a laterally disposed hollow trap member means providing a passageway leading from said liquid-solids receiving section into the trap member and therewith completing an interceptor trap, and equalizing pipe leading between the interior of the interceptor trap and the conditioning chamber, a filter, a pipe leading from the interceptor trap for passing entrapped liquid to the influent portion of the filter, means for passing filtrate from the filter to the fuel supply pipe, and means for forcing fresh liquid from the supply pipe into the aforementioned heat interchanging pipe coils.

2. A vaporizer according to claim 1, in which between the fuel supply pipe and the initial vaporizing pipe coils there is interposed pre-heating means for receiving fuel from the supply pipe and from which pre-heated fuel is passed into the initial vaporizing coils.

3. A vaporizer according to claim 1, having pre-heating means connected for receiving fuel from the supply pipe, chambered means having catalytic material therein and connected for receiving fuel from the pre-heating means and for passing fuel and vapor therefrom into the initial vaporizing coils.

4. A vaporizer for liquid hydrocarbon fuel such as crude petroleum comprising in combination a hollow casing having an inlet passage area for the inflow of hot gases and an outlet passage area for the outflow of said gases after passing over and in heat interchanging engagement with the pipe coils hereinafter referred to, a fuel supply pipe, a hollow structure providing therein a liquid-vapor separating chamber, means comprising pipe coils leading from the fuel supply pipe to and into the separating chamber, means functionally dividing the interior of the separating chamber into a vapor-receiving section and a liquid-receiving section, hollow structure providing a gas-vapor conditioning chamber, means including vaporizing pipe coils providing a meandering vapor flow pathway leading from the vapor-receiving section into the conditioning chamber, means providing a passageway for conducting vaporized fuel from the conditioning chamber, laterally disposed hollow means associated with the liquid-receiving section and providing therewith a liquid-interceptor trap, an equalizing pipe providing communication between the interior of the liquid-interceptor trap, and conditioning chamber, a closed type of filter structure having therein a filter medium and pipe leading from the interceptor trap for transferring excess accumulation of entrapped liquid from the interceptor trap to the influent-receiving portion of the filter structure, and means for passing filtrate from the effluent portion of the filter structure to the main supply pipe, and means for forcing fresh incoming liquid and the filtrate passed into the supply pipe forwardly within the supply pipe and into the first mentioned heat interchanging coil of the converter or vaporizer.

5. A vaporizer according to claim 4, embodying means for forcing incoming liquid fuel from an outside supply source as well as filtrate returned into the supply pipe forwardly within the supply pipe and into the means comprising pipe coils leading from the supply pipe.

6. A vaporizer for liquid hydrocarbon fuel comprising in combination a hollow casing having an inlet and an outlet for gases passing into, through and therefrom, a main fuel supply pipe, pre-heating means connected for receiving fuel from said supply pipe, a hollow means providing a liquid-receiving pocket connected for receiving fuel from the pre-heating means, a hollow structure providing therein a liquid-vapor separating chamber, initial vaporizing pipe coils leading from the liquid-receiving pocket into the separating chamber, baffle means dividing the interior of said separating chamber into a liquid-solids receiving section and a vapor-receiving section, a hollow member providing a catalyzing chamber, catalytic material in said chamber, means providing a vapor passageway leading from said vapor-receiving section into the catalyzing chamber, a hollow structure providing a conditioning chamber, subsequent vaporizing pipe coils leading from the catalyzing chamber into the conditioning chamber, a means providing a passageway for conducting the conditioned vaporized fuel from the vaporizing chamber, a hollow trap member, means providing a passageway leading from said liquid-solids receiving section into the trap member and therewith completing an interceptor trap, a gas pressure equalizing pipe leading between the interior of the interceptor trap and the conditioning chamber, a filter, means providing a passageway, pipe leading from the interceptor trap for passing excess accumulations of entrapped liquid to the influent-receiving portion of the filter, means for passing filtrate from the filter to the fuel supply pipe and means for forcing fresh incoming liquid fuel forwardly within the supply pipe and into the aforementioned pipe coils, which said vaporizing pipe coils are disposed so as to be contacted with the hot gases flowing through the aforementioned hollow casing.

7. A vaporizer for liquid hydrocarbon fuel such as crude petroleum comprising in combination a hollow enclosing casing having inlet passage area for the flow thereinto of hot gases of combustion and outlet passage area for the discharge of said gases of combustion after passing over and in heat interchanging engagement with the pipe coils hereinafter referred to, a main fuel feed pipe, heat interchanging pipe coils connected for receiving fuel from the feed pipe, a hollow means providing a catalyst holding pocket, catalytic material in said pocket, a hollow structure providing a liquid-vapor separating chamber, initial vaporizing pipe coils leading from said pocket into said separating chamber, baffle means functionally dividing the interior of the separating chamber into a liquid-solids receiving section and a vapor receiving section, catalytic material in said vapor receiving section, said baffle means being disposed so as to obstruct direct straight-line flow from the delivery portion of the initial vaporizing coils into said vapor receiving section, a hollow conditioning structure providing a mixing chamber, subsequent vaporizing pipe coils leading from the interior of said vapor receiving section into the mixing chamber, a valve-controlled pipe leading from the mixing chamber for conducting vaporized fuel therefrom, a laterally disposed trap member, means providing a passageway leading from said liquid-solids receiving section of the separating chamber into said trap member and therewith completing an interceptor trap, a gas pressure equalizing pipe leading between the interior of the interceptor trap and the mixing chamber, a closed filter for separating solids from the liquid fuel pipe leading from the interceptor trap for conducting therefrom excess quantities of trapped liquid with solids suspended therein into the intake portion of the filter, a fuel supply means for holding liquid fuel to be converted and from which the feed pipe line extends, means for passing filter effluent into the fresh untreated fuel supplied to the vaporizer, and means for forcing filtrate and fresh incoming liquid forwardly into the heat-interchanging pipe coils of the vaporizer.

8. In a system employing the indirect application of heat derived from hot exhaust gases, typified by hot exhaust gases from an internal hydrocarbon combustion engine, for the conversion of liquid hydrocarbon fuel into vaporous and gaseous form and as to which the converted gaseous fuel thus produced is suitable as a fuel supply to an air-vapor mixing means for realizing a combustible mixture suitable for delivery into the intake side of the engine wherein the combustible mixture thus supplied is ignited within the power producing chamber thereof for operating the engine, which system comprises in operative combination a liquid hydrocarbon fuel supply means, a chamber providing structure in the form of a casing for receiving hot gases and an outlet for partially cooled gases leaving the chamber after having heat-interchanging contact with the pipe coils hereinafter referred to and which are located so as to be exposed to the gases flowing through the chamber, a chambered liquid-vapor separating structure, baffle means in said separating structure for dividing the chamber therein into functionally separated vapor receiving section and liquid-solids receiving section, a hollow member providing therein a vapor-gas conditioning chamber, initial vaporizing pipe coils connected for receiving incoming fuel from the fuel supply means and for delivering heated fuel and vaporized hydro-carbons thereof into said chambered separating structure whereby the delivered heated fuel and vapors come under the functioning influence of the baffle means and are separated whereby vapors pass into the aforementioned vapor receiving section while liquid-solids thereof pass into the aforementioned liquid-solids receiving section, subsequent heat interchanging vaporizing pipe coils connected for passing vapors from the aforementioned vapor receiving section into the aforementioned gas-conditioning chamber, a gas-air mixing means, means for passing gases from the conditioning chamber into the gas-air mixing means, a filter for separating solid residues suspended in unvaporized portions of partially treated liquid fuel, means for conducting liquid bearing suspended solids from the aforementioned liquid-solids receiving section and for delivering the thus conducted liquid into the influent portion of the filter, and means for passing filtered liquid from the filtrate delivery portion of said filter and for returning the filtered liquid into the liquid hydrocarbon fuel en route to the first mentioned pipe coils.

9. In the conversion of liquid hydrocarbon fuel into gaseous form suitable when mixed with air for realizing a combustible mixture which when delivered into the intake portion of a hydrocarbon engine and ignited in the cylinder thereof is suitable to serve as the operating mixture therefor, a method comprising continually supplying liquid hydrocarbon fuel typified by crude petroleum, progressively heating the fuel thus supplied to convert certain of the liquid hydrocarbon constituents into vaporous form, separating the hydrocarbon vapors and such gaseous hydrocarbon as may be intermixed with the vapors from the hydrocarbon constituents remaining as liquids, subjecting the separated out vapors and gases to further heating for conversion of the vapors into gaseous form, mixing the hydrocarbon thus converted into gaseous form with air thereby producing a combustible mixture which when ignited performs a useful purpose, progressively diverting quantities of the separated out liquid constituents and returning the same to the incoming liquid hydrocarbon being supplied for re-treatment therewith, filtering the thus diverted partially treated fuel to remove residual solids suspended therein prior to the re-treatment of the filtrate with the incoming fuel.

10. A method as per claim 9, in which the treating of separated out vapors and gases intermixed therewith is carried out in the presence of a catalytic agent.

LOVELL LANDERS, Jr.